(12) United States Patent
Nakazono et al.

(10) Patent No.: US 7,457,470 B2
(45) Date of Patent: Nov. 25, 2008

(54) IMAGE PROCESSING APPARATUS

(75) Inventors: Keisuke Nakazono, Hino (JP); Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 694 days.

(21) Appl. No.: 11/196,621

(22) Filed: Aug. 2, 2005

(65) Prior Publication Data
US 2006/0034547 A1 Feb. 16, 2006

(30) Foreign Application Priority Data
Aug. 10, 2004 (JP) .............................. 2004-233486
Oct. 20, 2004 (JP) .............................. 2004-306106

(51) Int. Cl.
G06K 9/36 (2006.01)
(52) U.S. Cl. .................................................. 382/233
(58) Field of Classification Search ......... 382/232–233, 382/298–300; 358/449, 451, 528
See application file for complete search history.

(56) References Cited

U.S. PATENT DOCUMENTS

| 5,327,254 A | * | 7/1994 | Daher .......................... 382/298 |
| 5,845,015 A | * | 12/1998 | Martucci ..................... 382/250 |
| 5,859,651 A | * | 1/1999 | Potu ............................. 345/538 |
| 6,445,828 B1 | * | 9/2002 | Yim ............................. 382/250 |
| 6,906,748 B1 | * | 6/2005 | Kawase et al. .............. 348/246 |
| 7,039,242 B2 | * | 5/2006 | Ueno .......................... 382/232 |

FOREIGN PATENT DOCUMENTS

JP  2000-311241  11/2000

* cited by examiner

*Primary Examiner*—Jose L Couso
(74) *Attorney, Agent, or Firm*—Straub & Pokotylo; John C. Pokotylo

(57) ABSTRACT

An image processing apparatus subjects, to image processing for reproduction, input compressed image data or compressed image data read from a recording medium, and the apparatus includes an expansion processing unit which subjects the compressed image data to expansion processing to obtain expanded image data. A storage unit stores the expanded image data. A resize unit reads, block by block, the expanded image data stored in the storage unit and then subjects the expanded image data to resize processing to obtain image data for display. A control unit controls execution of the resize processing by the resize unit in accordance with the number of expanded image data stored in the storage unit.

20 Claims, 10 Drawing Sheets

IMAGE PROCESSING APPARATUS

CROSS-REFERENCE TO RELATED APPLICATIONS

This application is based upon and claims the benefit of priority from prior Japanese Patent Applications No. 2004-233486, filed Aug. 10, 2004; and No. 2004-306106, filed Oct. 20, 2004, the entire contents of both of which are incorporated herein by reference.

BACKGROUND OF THE INVENTION

1. Field of the Invention

The present invention relates to an image processing apparatus, in particular to an image processing apparatus capable of reproducing/displaying compressed image data.

2. Description of the Related Art

Proposals concerning an image processing apparatus capable of pipelining of multiple image processing include Jpn. Pat. Appln. KOKAI Publication No. 2000-311241, wherein low-capacity memories are connected in series between an image processing unit which performs JPEG processing (JPEG compression and JPEG expansion) and a scaling processing unit which performs scaling of an image (resize processing), thereby enabling the pipelining of the processing in these units. In Jpn. Pat. Appln. KOKAI Publication No. 2000-311241, image data processed in the image processing unit is stored once in the memory, and the stored image data is read in predetermined block units and then subjected to scaling processing.

A technique in Jpn. Pat. Appln. KOKAI Publication No. 2000-311241 will be described referring to FIG. 14. In an image processing apparatus of FIG. 14, a JPEG processing unit 102, a resize processing unit 103, a memory card 105 via a media interface 104, a memory (SDRAM) 106 and a video interface 107 are connected to a bus 101. Here, the JPEG processing unit 102 comprises an input DMA 102a, a JPEG compression/expansion section 102b, a buffer memory 102c and an output DMA 102d, while the resize processing unit 103 comprises an input DMA 103a, a resize section 103b and an output DMA 103c.

In such a configuration, when the image stored in the memory card 105 is reproduced, compressed image data is first read from the memory card 105 via the media interface 104, and the read compressed image data is stored once in the SDRAM 106. Then, the compressed image data stored in the SDRAM 106 is read via the input DMA 102a in the JPEG processing unit 102. The read compressed image data is input to the JPEG compression/expansion section 102b where it is expanded. Expanded image data which has been obtained by the expansion in the JPEG compression/expansion section 102b is output to the bus 101 via the buffer memory 102c and the output DMA 102d, and stored in the SDRAM 106.

Subsequently, the expanded image data stored in the SDRAM 106 is read via the input DMA 103a in the resize processing unit 103. The read expanded image data is input to the resize section 103b where it is resized into a proper display size. Resized expanded image data is output to the bus 101 via the output DMA 103c, and stored in the SDRAM 106.

Then, the expanded image data stored in the SDRAM 106 is read by the video interface 107, thereby displaying an image on an unshown image display device such as a TFT-LCD.

Of the above processing, the expansion processing and the resize processing are performed sequentially in time as shown in FIG. 15. In the technique of Jpn. Pat. Appln. KOKAI Publication No. 2000-311241, if a user performs a key operation to reproduce an image, reading of the compressed image data is started via the media interface 104, and when the reading of the compressed image data is terminated, the expansion processing is started. When expansion of the compressed image data for one frame is terminated in the expansion processing, the resize processing is started, and the expanded image data is resized every predetermined block.

BRIEF SUMMARY OF THE INVENTION

According to a first aspect of the present invention, there is provided an image processing apparatus which subjects, to image processing for reproduction, at least one of input compressed image data and compressed image data read from a recording medium, the apparatus comprising:

an expansion processing unit which subjects the compressed image data to expansion processing to obtain expanded image data;

a storage unit which stores the expanded image data;

a resize unit which reads every block the expanded image data stored in the storage unit and then subjects the expanded image data to resize processing to obtain image data for display; and a control unit which controls execution of the resize processing by the resize unit in accordance with the number of expanded image data stored in the storage unit.

According to a second aspect of the present invention, there is provided an image processing apparatus which subjects, to image processing for reproduction, at least one of input compressed image data and compressed image data read from a recording medium, the apparatus comprising:

an expansion processing unit which subjects the compressed image data to expansion processing to obtain expanded image data;

a storage unit having a buffer with the predetermined number of memory area lines to write the expanded image data;

a resize processing unit which reads, block by block, the expanded image data written in the storage unit and then subjects the expanded image data to resize processing to obtain image data for display; and a control unit which controls writing of the expanded image data from the expansion processing unit to the storage unit on the basis of a buffer free space in the buffer, and also controls reading of the expanded image data from the storage unit to the resize processing unit on the basis of a valid data amount in the expanded image data stored in the buffer.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
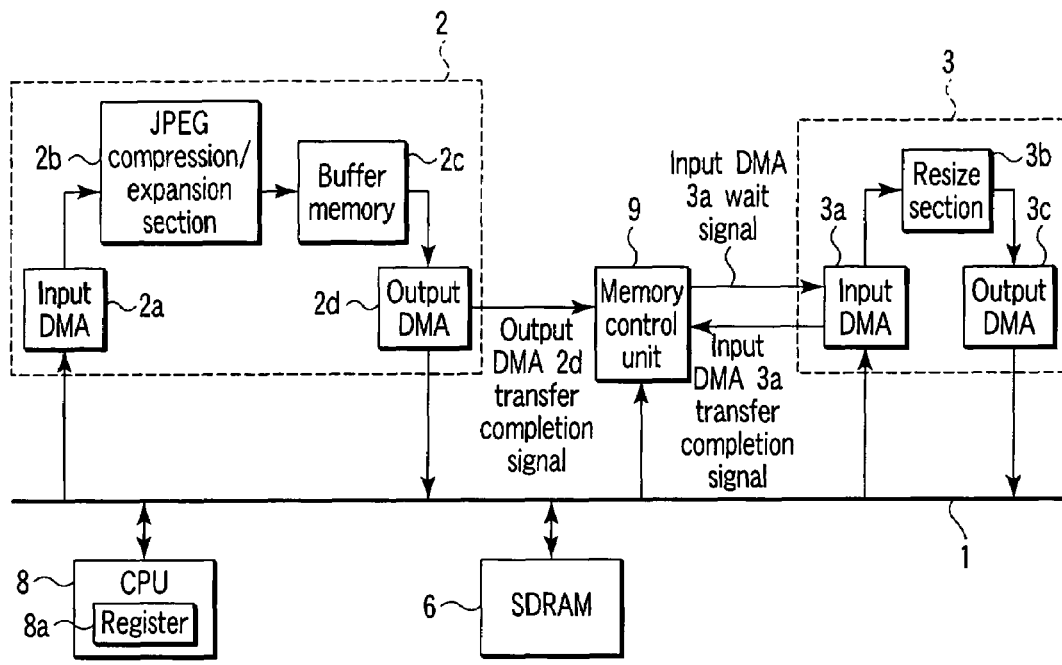
FIG. 1 is a block diagram showing a configuration of an image processing apparatus according to a first embodiment of the present invention.

Embodiments of the present invention will hereinafter be described referring to the drawings.

First Embodiment

FIG. 1 is a block diagram showing a configuration of an image processing apparatus according to a first embodiment of the present invention.

In the image processing apparatus of FIG. 1, a JPEG processing unit 2 as an expansion processing unit, a resize processing unit 3 as a resize unit, a memory (SDRAM) 6 as a storage unit, a CPU 8, and a memory control unit 9 as a control unit are connected to a bus 1. Here, although not shown in FIG. 1, a media interface to perform data transfer between the apparatus and a memory card in which compressed image data is recorded, a video interface to perform data transfer between the apparatus and an image display device such as a TFT-LCD, and the like are also connected to the bus 1.

Furthermore, in FIG. 1, the JPEG processing unit 2 comprises an input DMA 2a, a JPEG compression/expansion section 2b, a buffer memory 2c and an output DMA 2d. Moreover, the resize processing unit 3 comprises an input DMA 3a, a resize section 3b and an output DMA 3c. Further, in FIG. 1, the output DMA 2d of the JPEG processing unit 2 and the input DMA 3a of the resize processing unit 3 are connected to the memory control unit 9.

Still further, a register 8a is provided in the CPU 8, and the memory control unit 9 is configured to be able to read, via the bus 1, register set values stored in the register 8a. Here, the register set values stored in the register 8a are the number of output DMA 2d transfer lines as the first predetermined number of data, the number of input DMA 3a transfer lines as the second predetermined number of data, and the necessary number of data lines as a predetermined value. These register set values will be described later.

An operation of the image processing apparatus having the configuration as in FIG. 1 will be described. First, when compressed image data is read via the unshown media interface, the read compressed image data is stored once in the SDRAM 6. Then, the compressed image data stored in the SDRAM 6 is read by the JPEG processing unit 2. The read compressed image data is input, via the input DMA 2a, to the JPEG compression/expansion section 2b where it is expanded.

In the first embodiment, expanded image data which has been obtained by the expansion in the JPEG compression/expansion section 2b are sequentially output to the bus 1 via the buffer memory 2c and the output DMA 2d, and stored in the SDRAM 6. Then, when transfer of the expanded image data for the predetermined number of lines is terminated, an output DMA 2d transfer completion signal is output from the output DMA 2d to the memory control unit 9. Here, when JPEG image data such as YC422 as the compressed image data is expanded, the image data for eight lines is expanded in the expansion processing at a time. In the first embodiment, the output DMA 2d transfer completion signal is output to the memory control unit 9 whenever the expanded image data for eight lines is transferred.

Here, in the first embodiment, the memory control unit 9 controls resize processing in the resize section 3b, more particularly, image data reading in the input DMA 3a in the resize processing unit 3. That is, if the expanded image data stored in the SDRAM 6 is not sufficient to allow the resize processing to be performed in the resize section 3b, an input DMA 3a wait signal is output from the memory control unit 9 to the input DMA 3a of the resize processing unit 3. In the input DMA 3a, while the input DMA 3a wait signal is being output, the expanded image data is not read, and the resize processing is suspended.

On the other hand, if the expanded image data stored in the SDRAM 6 is sufficient for the resize processing to be performed, output of the input DMA 3a wait signal from the memory control unit 9 to the input DMA 3a is stopped. In this case, reading of an amount of the expanded image data necessary for the resizing is started via the input DMA 3a, and the read expanded image data is input to the resize section 3b. When transfer of the amount of expanded image data necessary for the resizing from the input DMA 3a to the resize section 3b is terminated, an input DMA 3a transfer completion signal is output from the input DMA 3a to the memory control unit 9. Then, the input expanded image data is resized into a proper display size in the resize section 3b, thereby generating image data for display.

Figure 2:
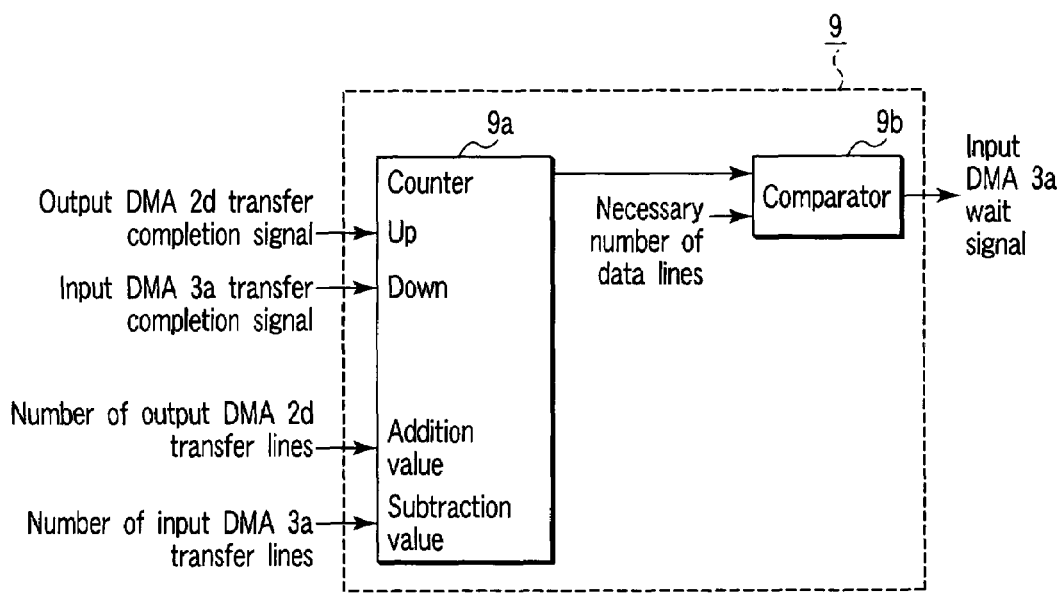
FIG. 2 is a diagram showing a detailed configuration of a memory control unit in the first embodiment of the present invention.

FIG. 2 is a diagram showing a detailed configuration of the memory control unit 9 as an essential part in the first embodiment.

The memory control unit 9 in FIG. 2 comprises a counter 9a and a comparator 9b. In FIG. 2, the output DMA 2d transfer completion signal is input to an up-input terminal of the counter 9a. Further, the input DMA 3a transfer completion signal is input to a down-input terminal of the counter 9a. Still further, in FIG. 2, the register set values of the register 8a are input to an addition value input terminal and a subtraction value input terminal of the counter 9a. The register set value "number of output DMA 2d transfer lines" is input to the addition value input terminal of the counter 9a. This number of output DMA 2d transfer lines is a set value which indicates a time point at which the output DMA 2d transfer completion signal is output from the output DMA 2d. For example, in a case of the YC422 JPEG image data, the expanded image data for eight lines is obtained at a time. Thus, in the first embodiment, the number of output DMA 2d transfer lines is defined as 8. It is to be noted that the value of the number of output DMA 2d transfer lines can be changed depending on a specification or the like of the output DMA 2d.

Furthermore, the register set value "number of input DMA 3a transfer lines" is input to the subtraction value input terminal of the counter 9a. This number of input DMA 3a transfer lines is a set value which indicates a time point at which the input DMA 3a transfer completion signal is output from the input DMA 3a. In the first embodiment, the number of input DMA 3a transfer lines is defined as the number of data lines on which the resize processing can be performed by the resize processing unit 3. Here, the number of input DMA 3a transfer lines is defined as 10, for example. It is to be noted that the value of the number of input DMA 3a transfer lines can be changed depending on a specification or the like of the input DMA 3a.

Still further, in FIG. 2, an output portion of the counter 9a is connected to one input portion of the comparator 9b. Moreover, the register set value "necessary number of data lines" is input to the other input portion of the comparator 9b. This number of data lines is the number of data necessary for the resize section 3b to perform the resize processing. For example, in the first embodiment, the necessary number of data lines is defined as 10 lines (one block).

Figure 3:
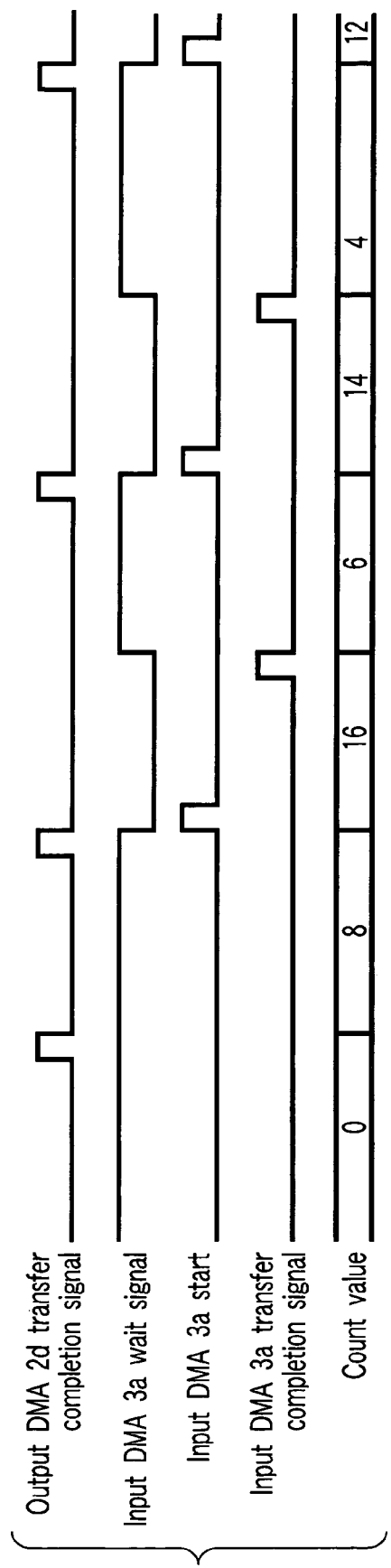
FIG. 3 is a timing chart showing, in a time-series manner, states of an output DMA 2d, a memory control unit 9, an input DMA 3a and a counter 9a during image reproduction in the first embodiment of the present invention.

An operation of the memory control unit 9 having the configuration as in FIG. 2 will be described referring to FIG. 3. FIG. 3 is a timing chart showing, in a time-series manner, states of the output DMA 2d, the memory control unit 9, the input DMA 3a and the counter 9a during image reproduction.

During the image reproduction, when the compressed image data is read and the transfer of the expanded image data for eight lines is terminated in the output DMA 2d of the JPEG processing unit 2, the output DMA 2d transfer completion signal is output from the output DMA 2d to the counter 9a. In response to this, in the counter 9a, a count value is incremented by the number of output DMA 2d transfer lines=8. Thus, the count value of the counter 9a will be "8". Then, in the comparator 9b, the count value "8" of the counter 9a is compared with the necessary number of data lines "10". This time, the count value<the necessary number of data lines. In this case, since the amount of expanded image data necessary for the resize processing is not stored in the SDRAM 6, the output of the input DMA 3a wait signal continues.

Subsequently, when the transfer of the expanded image data for eight lines is again terminated in the output DMA 2d of the JPEG processing unit 2, the output DMA 2d transfer completion signal is output from the output DMA 2d to the counter 9a. In response to this, the count value of the counter 9a is incremented and will be "16". Then, in the comparator 9b, the count value "16" of the counter 9a is compared with the necessary number of data lines "10". This time, the count value>the necessary number of data lines. In this case, since the amount of expanded image data necessary for the resize processing is stored in the SDRAM 6, the output of the input DMA 3a wait signal is stopped.

Thus, the reading of the expanded image data is started via the input DMA 3a. When the transfer, to the resize section 3b, of the expanded image data read by the input DMA 3a is terminated, the input DMA 3a transfer completion signal is output from the input DMA 3a to the counter 9a. In response to this, in the counter 9a, the count value is decremented by the number of input DMA 3a transfer lines=10. Thus, the count value of the counter 9a will be "6". Then, in the comparator 9b, the count value "6" of the counter 9a is compared with the necessary number of data lines "10". This time, the count value<the necessary number of data lines. In this case, since the amount of expanded image data necessary for the resize processing is not stored in the SDRAM 6, the output of the input DMA 3a wait signal is resumed. Subsequently, the count value is compared with the necessary number of data lines in the comparator 9b in the same manner, thereby controlling the output of the input DMA 3a wait signal.

Figure 4:
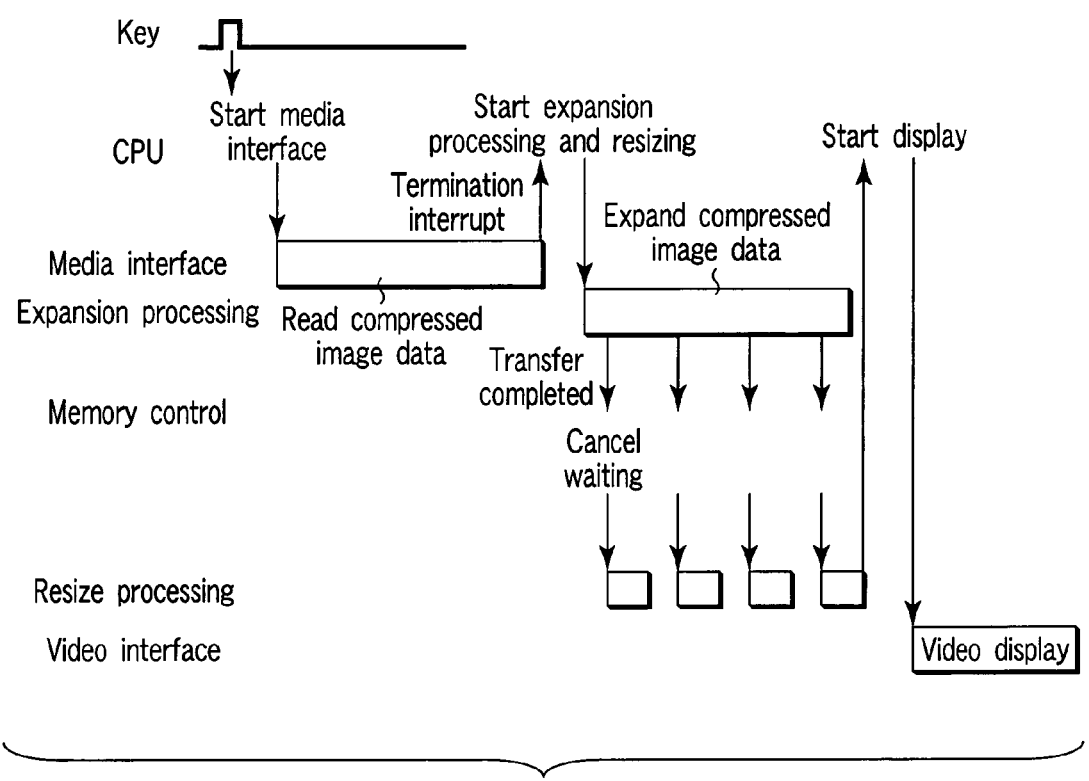
FIG. 4 is a diagram showing, in a time-series manner, a flow of data processing during the image reproduction in the first embodiment of the present invention.

FIG. 4 is a timing chart during the image reproduction in the first embodiment. As shown in FIG. 4, in the first embodiment, when the reading of the compressed image data is terminated, the JPEG expansion processing and the resize processing are started substantially at the same time. Then, when the predetermined number of compressed image data (one block) is expanded and stored in the SDRAM 6, the waiting of the resize processing unit 3 is cancelled so that the block-by-block resize processing is executed.

Thus, in the first embodiment, even if the expansion processing of image data for one frame is not terminated, the resize processing is performed when the expanded image data necessary for the resize processing is stored in the SDRAM 6. This enables pipelining of the JPEG processing and the resize processing, and makes it possible to reduce a response time from when a user performs a key operation for image reproduction to when the image is actually displayed. Moreover, since the CPU 8 does not need to monitor and follow the number of transfer lines for the expanded image data and the number of lines for the resized image data, following processing can be performed without increasing load on the CPU 8.

Second Embodiment

Figure 5:
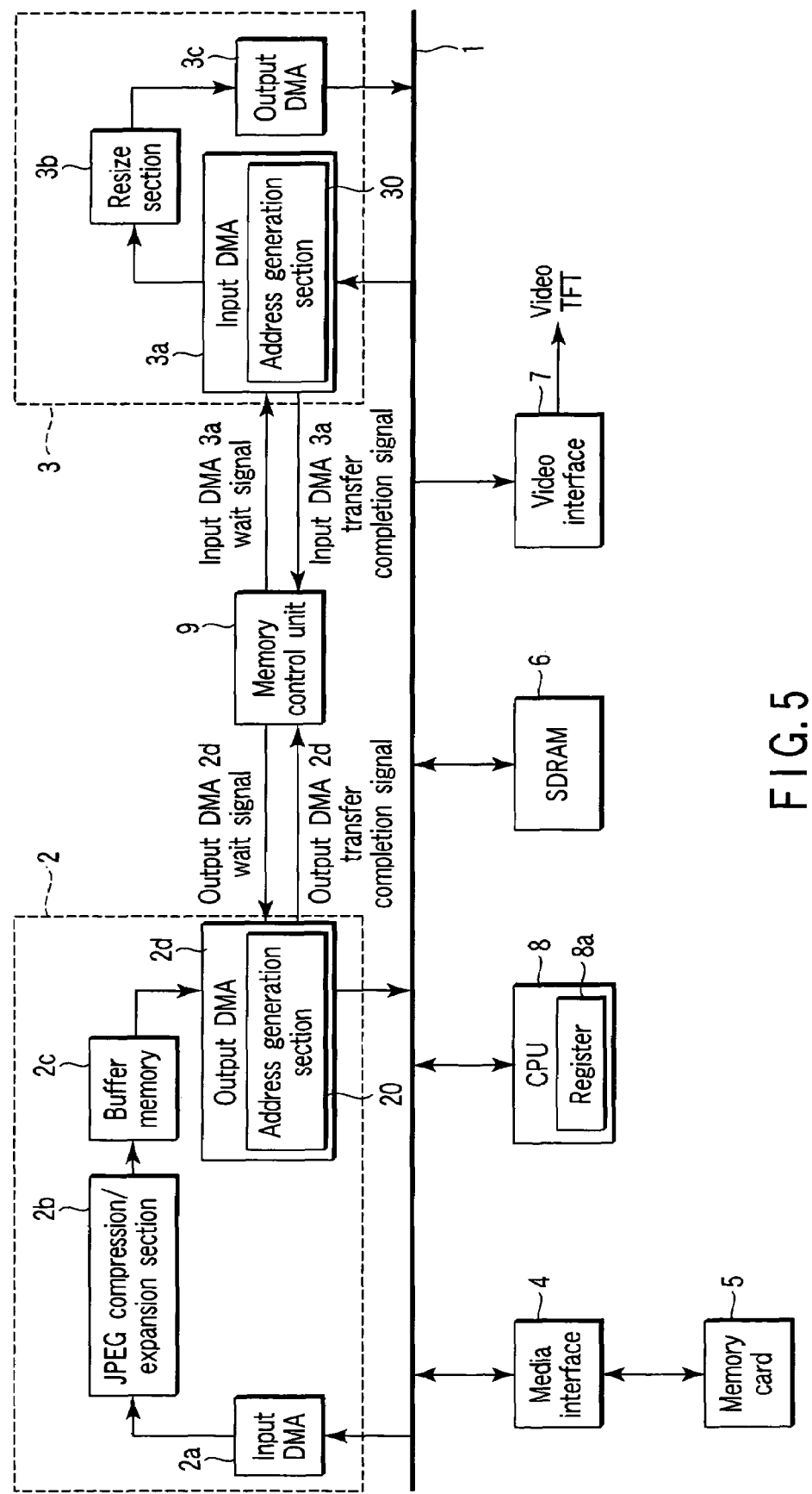
FIG. 5 is a block diagram showing a configuration of an image processing apparatus according to a second embodiment of the present invention.

Next, a second embodiment of the present invention will be described. FIG. 5 is a block diagram showing a configuration of an image processing apparatus according to the second embodiment of the present invention.

In the image processing apparatus of FIG. 5, a JPEG processing unit 2 as an expansion processing unit, a resize processing unit 3 as a resize unit, a media interface 4, a memory (SDRAM) 6 as a storage unit, a video interface 7, a CPU 8, and a memory control unit 9 as a control unit are connected to a bus 1. Here, a recording medium (memory card) is connected to the media interface 4. Further, an unshown display section such as a TFT-LCD is connected to the video interface 7.

Furthermore, in FIG. 5, the JPEG processing unit 2 comprises an input DMA 2a, a JPEG compression/expansion section 2b, a buffer memory 2c and an output DMA 2d. Moreover, the resize processing unit 3 comprises an input DMA 3a, a resize section 3b and an output DMA 3c. Still further, in FIG. 5, both the output DMA 2d of the JPEG processing unit 2 and the input DMA 3a of the resize processing unit 3 are connected to the memory control unit 9.

Still further, a register 8a is provided in the CPU 8, and the memory control unit 9 is configured to be able to read, via the bus 1, register set values stored in the register 8a. Here, the register set values stored in the register 8a are the necessary number of free lines, the necessary number of data lines and the number of memory area lines. These register set values will be described later in detail.

Figure 6:
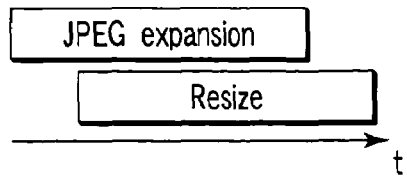
FIG. 6 is a timing chart of JPEG expansion processing and resize processing in the second embodiment of the present invention.

The configuration as in FIG. 5 enables pipelining of JPEG expansion in the JPEG processing unit 2 and resize processing in the resize processing unit 3 as shown in FIG. 6. An operation of the image processing apparatus having the configuration as in FIG. 5 will be described.

First, when compressed image data is read from a memory card 5 via the media interface 4, the read compressed image data is stored once in the SDRAM 6. Then, the compressed image data stored in the SDRAM 6 is read by the JPEG processing unit 2. The read compressed image data is input, via the input DMA 2a, to the JPEG compression/expansion section 2b where it is expanded.

In the second embodiment, expanded image data which has been obtained by the expansion in the JPEG compression/expansion section 2b are sequentially output to the bus 1 via the buffer memory 2c and the output DMA 2d, and then stored in the SDRAM 6. Then, when transfer of the expanded image data for the predetermined number of lines is terminated, an output DMA 2d transfer completion signal is output from the output DMA 2d to the memory control unit 9. Here, when JPEG image data such as YC422 as the compressed image data is expanded, the image data for eight lines is expanded in the expansion processing at a time. In the second embodiment, the output DMA 2d transfer completion signal is output to the memory control unit 9 whenever the expanded image data for eight lines is transferred.

Then, reading, from the SDRAM 6, of an amount of expanded image data necessary for the resizing is started via the input DMA 3a, and the read expanded image data is input to the resize section 3b. When transfer, from the input DMA 3a to the resize section 3b, of the amount of expanded image data necessary for resizing is terminated, an input DMA 3a transfer completion signal is output from the input DMA 3a to the memory control unit 9. Then, the input expanded image data is resized into a proper display size in the resize section 3b, thereby generating resized image data as image data for display.

Figure 7:
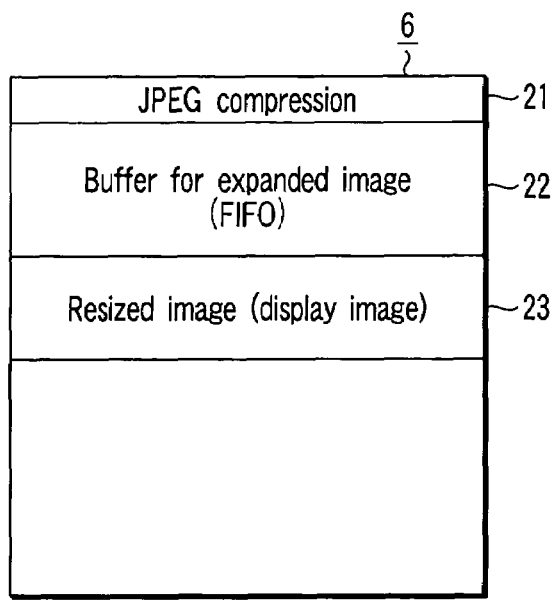
FIG. 7 is a diagram conceptually showing a memory area of a SDRAM in the second embodiment of the present invention.

FIG. 7 is a diagram conceptually showing a memory area of the SDRAM 6. As shown in FIG. 7, in the second embodiment, the compressed image data, the expanded image data and the resized image data are stored in separate memory areas in the SDRAM 6. That is, the compressed image data are sequentially stored in a compressed image data storage area 21. Further, the expanded image data is stored in an expanded image buffer 22 in a first in first out (FIFO) method. Still further, the resized image data are sequentially stored in a resized image data storage area 23 of the SDRAM 6. Here, these memory areas can only store data for the predetermined number of lines (the number of memory area lines), and these image data are stored in the respective memory areas in a circulating manner. Such address control is performed, for example, by address generation sections 20, 30 in the output DMA 2d of the JPEG processing unit 2 and in the input DMA 3a of the resize processing unit 3.

Furthermore, in the second embodiment, the memory control unit 9 controls writing of the expanded image data into the SDRAM 6 performed by the output DMA 2d of the JPEG processing unit 2 and reading of the expanded image data from the SDRAM 6 performed by the input DMA 3a of the resize processing unit 3. When there is no free space in the expanded image buffer 22 of the SDRAM 6, the memory control unit 9 outputs an output DMA 2d wait signal to the output DMA 2d of the JPEG processing unit 2 so that the writing of the expanded image data into the SDRAM 6 performed by the output DMA 2d is suspended. Moreover, when the amount of expanded image data (valid data) valid for the resize processing in the resize section 3b of the resize processing unit 3 is not stored in the expanded image buffer 22 of the SDRAM 6, the memory control unit 9 outputs an input DMA 3a wait signal to the input DMA 3a of the resize processing unit 3 so that the reading of the expanded image data from the SDRAM 6 performed by the input DMA 3a is suspended.

Figure 8:
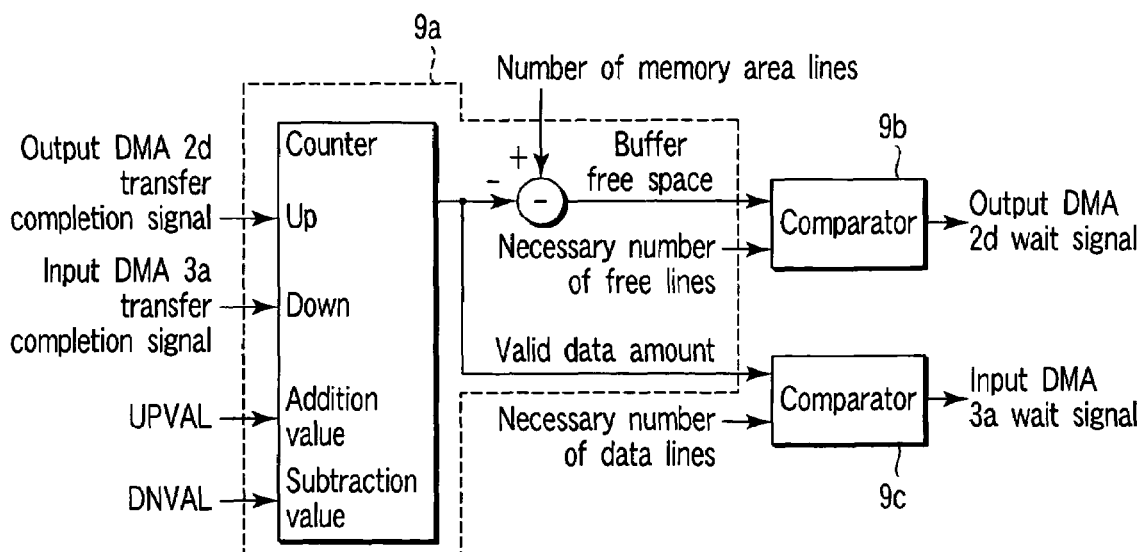
FIG. 8 is a diagram showing a detailed configuration of a memory control unit in the second embodiment of the present invention.

FIG. 8 is a diagram showing a detailed configuration of the memory control unit 9 as an essential part in the second embodiment.

The memory control unit 9 in FIG. 8 comprises a counter 9a and comparators 9b and 9c.

The counter 9a is a counter to count memory capacity of the SDRAM 6. In FIG. 8, the counter 9a comprises an up/down counter and a subtracter. Here, the output DMA 2d transfer completion signal is input to an up-input terminal of the up/down counter. Further, the input DMA 3a transfer completion signal is input to a down-input terminal of the up/down counter.

Furthermore, the register set values of the register 8a are input to an addition value input terminal and a subtraction value input terminal of the up/down counter. A register set value "UPVAL" is input to the addition value input terminal of the counter 9a. The "UPVAL" is a set value indicating an addition value of the counter 9a. The "UPVAL" is set to a value corresponding to the register set value "necessary number of free lines". Here, the necessary number of free lines means the number of free lines on the expanded image buffer 22 side which is necessary to write, into the expanded image buffer 22, the expanded image data obtained by the expansion processing. For example, in a case of the YC422 JPEG image data, the expanded image data for eight lines is obtained at a time, so that the expanded image data for eight lines is output from the output DMA 2d at a time. Thus, in the second embodiment, the necessary number of free lines (=UPVAL) is defined as 8. It is to be noted that the value of the necessary number of free lines can be changed depending on a specification or the like of the output DMA 2d.

Furthermore, a register set value "DNVAL" is input to the subtraction value input terminal of the counter 9a. The DNVAL is a set value indicating a subtraction value of the counter 9a. A value corresponding to the register set value "necessary number of data lines" is input to the DNVAL. Here, the necessary number of data lines means the number of data lines necessary to perform the resize processing. In the second embodiment, the number of data lines (=DNVAL) necessary for the resize processing in the resize processing unit 3 is defined as 10, for example. It is to be noted that the value of the necessary number of free lines can be changed depending on a specification or the like of the input DMA 3a.

Moreover, in FIG. 8, an output portion of the up/down counter is connected to the subtracter in which an output of the up/down counter is subtracted from the number of memory area lines of the expanded image buffer 22. Further, an output of the subtracter is input to one input portion of the comparator 9b. That is, this subtraction value will indicate the buffer free space of the expanded image buffer 22 of the SDRAM 6. Still further, the necessary number of free lines is input to the other input portion of the comparator 9b.

Furthermore, the output portion of the up/down counter is also connected to one input portion of the comparator 9c. A value from this output portion indicates the number of data lines (valid data amount) of expanded image data which is written in the expanded image buffer 22 and valid for the resize processing. Further, the necessary number of data lines is input to the other input portion of the comparator 9c.

Figure 9:
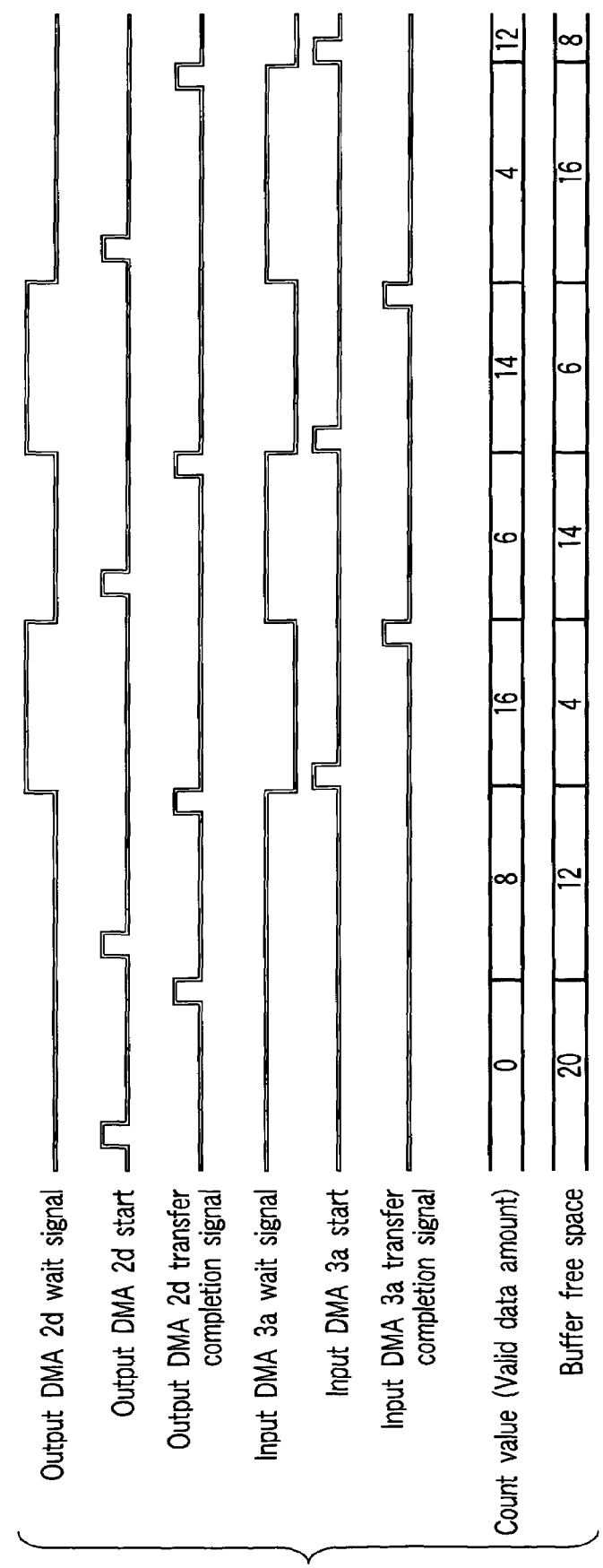
FIG. 9 is a timing chart showing, in a time-series manner, states of an output DMA 2d, a memory control unit 9, an input DMA 3a and an up/down counter during image reproduction in the second embodiment of the present invention.

An operation of the memory control unit 9 having the configuration as in FIG. 8 will be described referring to FIG. 9. FIG. 9 is a timing chart showing, in a time-series manner, states of the output DMA 2d, the memory control unit 9, the input DMA 3a and the up/down counter during image reproduction. It is to be noted that, in an example of FIG. 9, the number of memory area lines of the expanded image buffer of the SDRAM 6 is defined as, for example, 20.

During the image reproduction, when the compressed image data is read and the transfer of the expanded image data for eight lines is completed in the output DMA 2d of the JPEG processing unit 2, the output DMA 2d transfer completion signal is output from the output DMA 2d to the counter 9a. In response to this, a count value is incremented by the UPVAL=8 in the up/down counter of the counter 9a. Thus, the count value of the up/down counter will be "8". At the same time, the buffer free space: 20−8="12" is input to the comparator 9b, and the count value "8" is input to the comparator 9c.

Then, an output value from the counter 9a is compared both in the comparator 9b and the comparator 9c. In the comparator 9b, the buffer free space "12" is compared with the necessary number of free lines "8". This time, the buffer free space>the necessary number of free lines. In this case, since the expanded image buffer 22 has the free space sufficient to write the expanded image data, the output DMA 2d wait signal is not output, and the writing of the expanded image data from the output DMA 2d continues.

Furthermore, the valid data amount "8" is compared with the necessary number of data lines "10" in the comparator 9c. This time, the valid data amount<the necessary number of data lines. In this case, since the amount of expanded image data necessary for the resize processing is not written in the expanded image buffer 22, the output of the input DMA 3a wait signal continues.

Subsequently, when the transfer of the expanded image data for eight lines is again completed in the output DMA 2d of the JPEG processing unit 2, the output DMA 2d transfer completion signal is output from the output DMA 2d to the counter 9a. In response to this, the count value of the up/down counter of the counter 9a is incremented and will be "16". Thus, the value of the buffer free space will be "4", and the value of the valid data amount will be "16".

Then, the buffer free space "4" is compared with the necessary number of free lines "8" in the comparator 9b. This time, the buffer free space<the necessary number of free lines. In this case, since the expanded image buffer 22 does not have the free space sufficient to write the expanded image data, the output DMA 2d wait signal is output, and the writing of the expanded image data from the output DMA 2d is suspended.

Furthermore, the valid data amount "16" is compared with the necessary number of data lines "10" in the comparator 9c. This time, the valid data amount>the necessary number of data lines. In this case, since the expanded image data sufficient for the resize processing in the resize processing unit 3 is stored in the expanded image buffer 22, the output of the input DMA 3a wait signal is cancelled, and the expanded image data is read from the input DMA 3a.

When the transfer, to the resize section 3b, of the expanded image data read by the input DMA 3a is completed, the input DMA 3a transfer completion signal is output from the input DMA 3a to the counter 9a. In response to this, the count value is decremented by the DNVAL=10 in the up/down counter. Thus, the count value of the up/down counter will be "6". At this point, the value of the buffer free space will be "14", and the value of the valid data amount will be "6".

Then, the buffer free space "14" is compared with the necessary number of free lines "8" in the comparator 9b. This time, the buffer free space>the necessary number of free lines. In this case, since the expanded image buffer 22 has the free space sufficient to write the expanded image data, the output of the output DMA 2d wait signal is cancelled, and the writing of the expanded image data from the output DMA 2d is resumed.

Furthermore, the valid data amount "6" is compared with the necessary number of data lines "10" in the comparator 9c. This time, the valid data amount<the necessary number of data lines. In this case, since the expanded image data sufficient for the resize processing in the resize processing unit 3 is not stored in the expanded image buffer 22, the input DMA 3a wait signal is output, and the reading of the expanded image data from the input DMA 3a is suspended.

Subsequently, in the same manner, while comparison is made between the buffer free space and the necessary number of free lines and between the valid data amount and the necessary number of data lines, the output of the output DMA 2d wait signal and the input DMA 3a wait signal is controlled.

Figure 10:
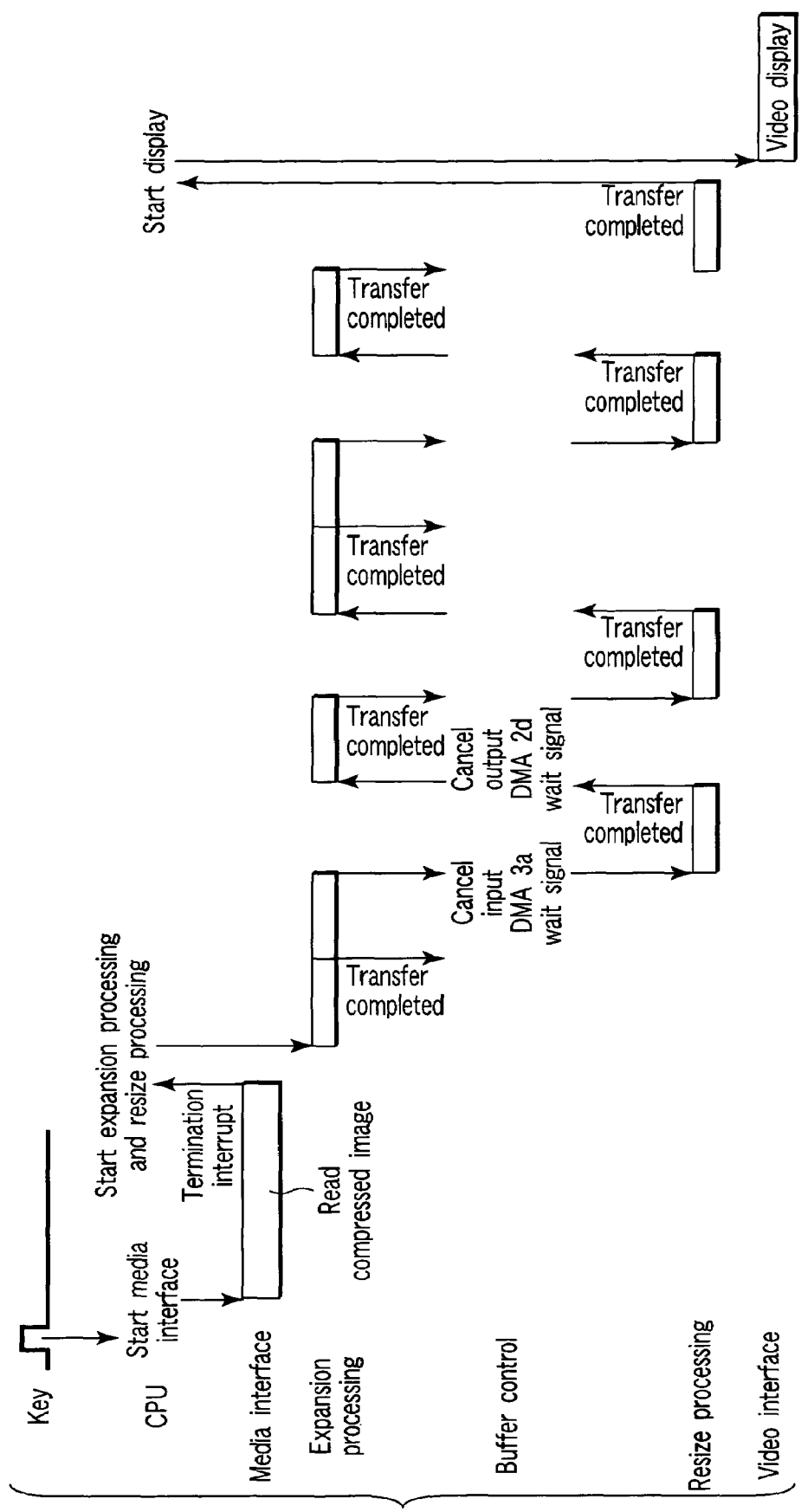
FIG. 10 is a diagram showing, in a time-series manner, a flow of data processing during the image reproduction in the second embodiment of the present invention.

FIG. 10 is a timing chart during the image reproduction in the second embodiment. As shown in FIG. 10, in the second embodiment, when the reading of the compressed image data is terminated, JPEG expansion processing and the resize processing are started substantially at the same time. Then, when the predetermined number of compressed image data (one block) is expanded and the expanded image data is written in the expanded image buffer 22, the waiting of the resize processing unit 3 is cancelled so that the block-by-block resize processing is executed. Thus, if the free space is created in the expanded image buffer 22, the waiting of the JPEG processing unit 2 is cancelled, so that the expanded image data which has been obtained by the JPEG expansion processing is written.

Figure 11:
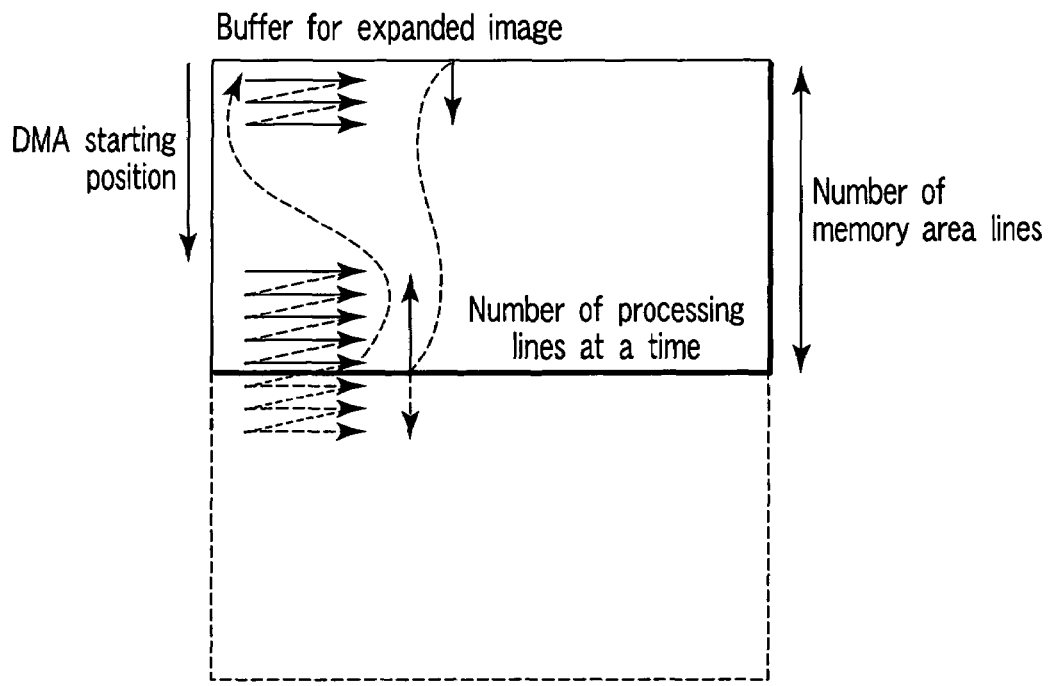
FIG. 11 is a diagram conceptually showing circular addressing when expanded image data is written to and read from an expanded image buffer in the second embodiment of the present invention.

FIG. 11 is a diagram conceptually showing circular addressing when the expanded image data is written to and read from the expanded image buffer 22. In the second embodiment, the expanded image data for the predetermined number of block lines is vertically written or read, as shown in FIG. 11. Here, when the expanded image data is written or read beyond the number of memory area lines, excess data is again written or read from an initial address of the expanded image buffer 22.

Figure 12:
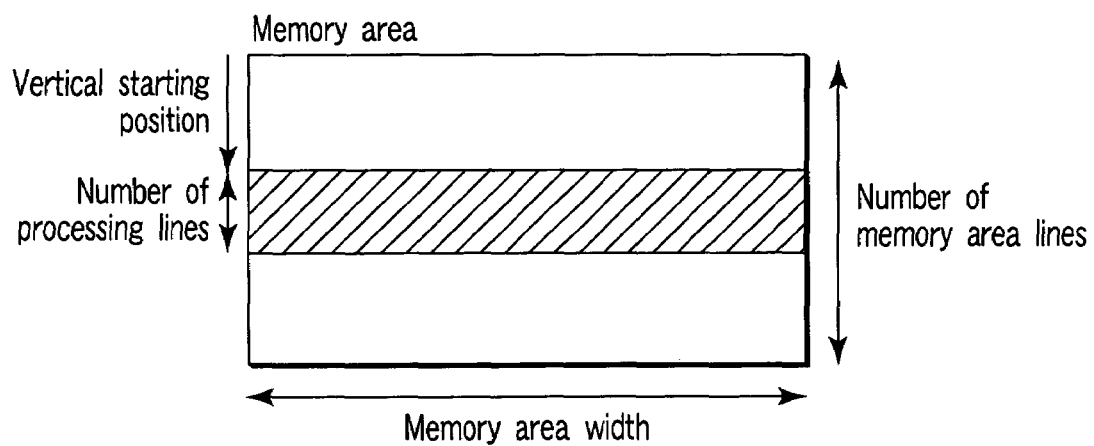
FIG. 12 is a diagram to explain the number of memory area lines, a memory area width, a vertical starting position and the number of processing lines.

A configuration of the address generation section to perform such addressing will be described below by way of example. It is to be noted that in the following description, the number of vertical total lines in the expanded image buffer 22 of the SDRAM 6 will be referred to as the "number of memory area lines", a horizontal address width as a "memory area width", the number of lines to start vertical writing or reading as a "vertical starting position", and the number of lines for the expanded image data written or read at a time as "number of processing lines" (see FIG. 12).

Figure 13:
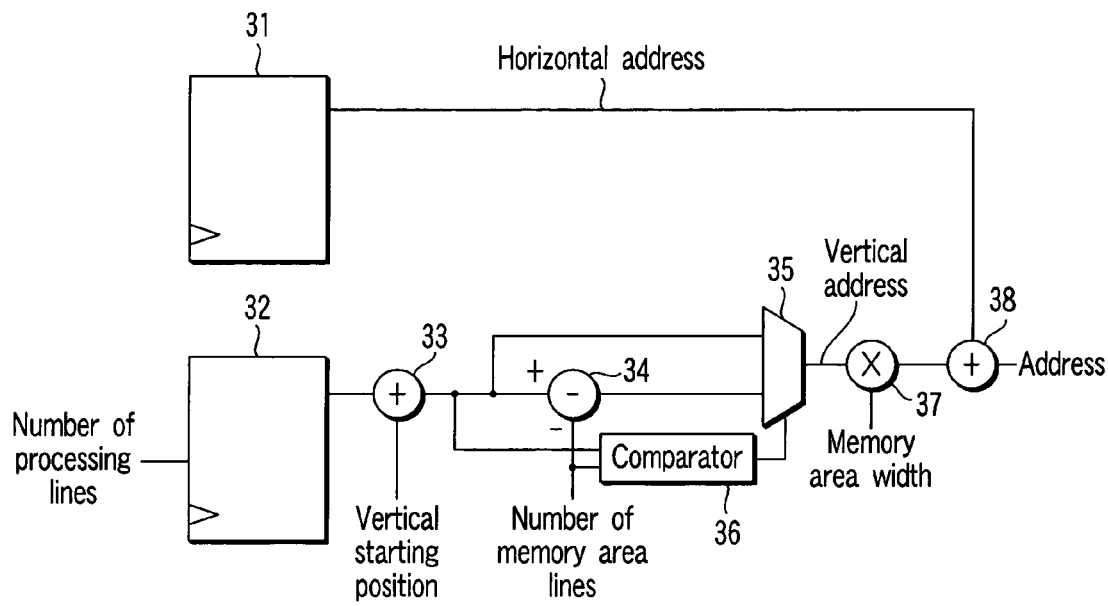
FIG. 13 is a diagram showing one example of a circuit configuration of an address generation section in the second embodiment of the present invention.
Figure 14:
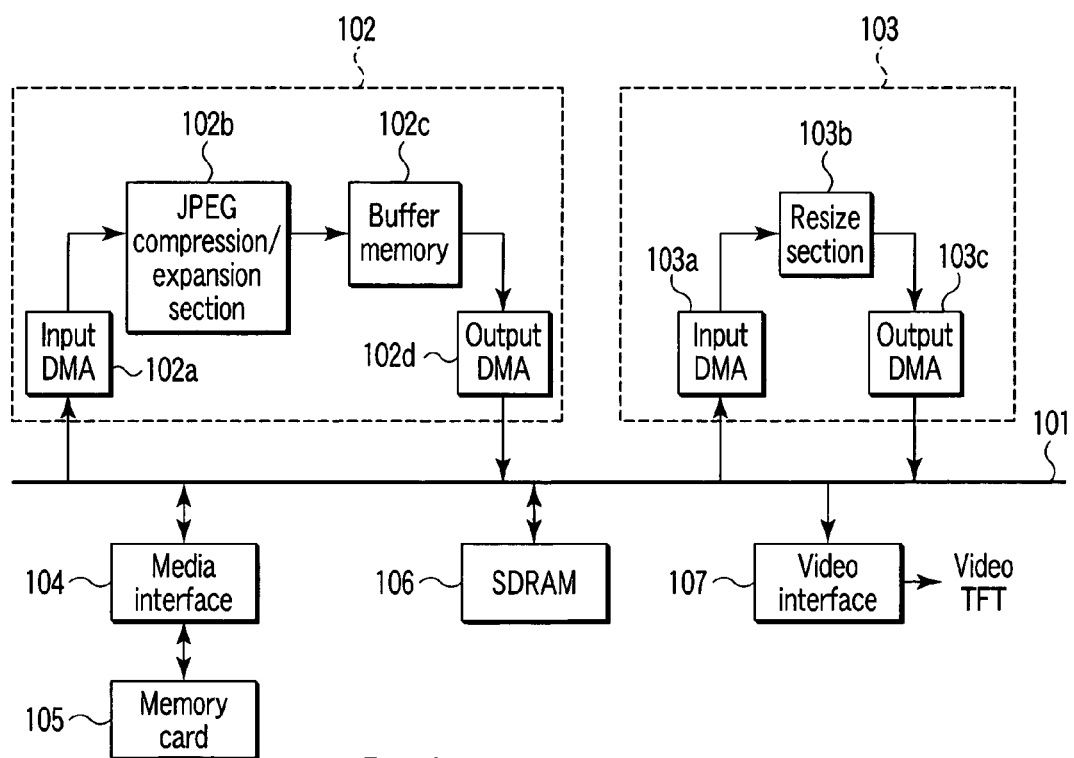
FIG. 14 is a block diagram showing a configuration of an image processing apparatus in a conventional example.
Figure 15:
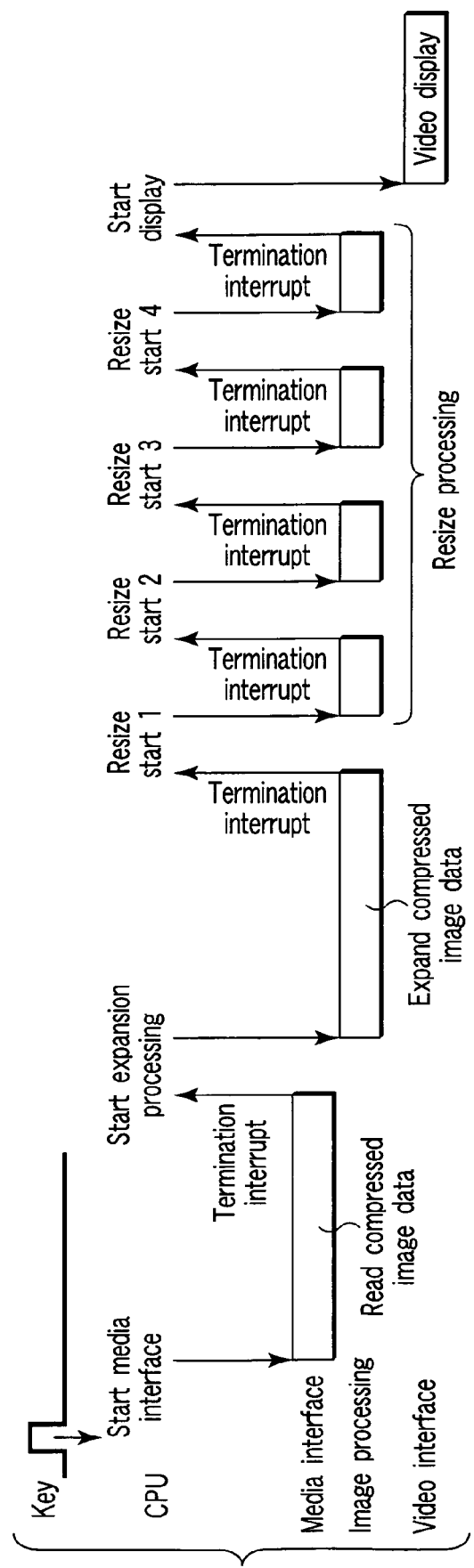
FIG. 15 is a diagram showing, in a time-series manner, a flow of data processing during image reproduction in the image processing apparatus in the conventional example.

FIG. 13 is a diagram showing one example of the address generation section 30 to perform the circular addressing. Here, the address generation section 20 inside the output DMA 2d of FIG. 5 has a configuration similar to that in FIG. 13.

In the address generation section of FIG. 13, an output portion of a horizontal counter 31 is connected to one input portion of an adder 38. Further, an output portion of a vertical counter 32 is connected to an adder 33. A maximum value of the vertical counter 32 is the number of processing lines, and a count value of the vertical counter 32 is reset to zero every time the number of processing lines is counted. These counters perform counting whenever the expanded image data is read by the input DMA 3a.

Furthermore, the vertical starting position is input to the other input portion of the adder 33. Moreover, an output portion of the adder 33 is connected to a plus input portion of a subtracter 34, one input portion of a selector 35 and one input portion of a comparator 36. The number of memory area lines is input to a minus input portion of the subtracter 34. Further, an output portion of the subtracter 34 is connected to the other input portion of the selector 35. Still further, the number of memory area lines is input to the other input portion of the comparator 36.

Furthermore, an output portion of the selector 35 is connected to one input portion of a multiplier 37. The memory area width is input to the other input portion of the multiplier 37. Moreover, an output portion of the multiplier 37 is connected to the other input portion of the adder 38.

In such a circuit, if the vertical counter 32 performs counting, the vertical starting position is added to the count value in the vertical counter 32.

The number of lines corresponding to this addition value is input to the comparator 36 where it is compared with the number of memory area lines, and one of the inputs of the selector 35 is selected in accordance with a comparison result of the comparator 36.

When the number of lines corresponding to the addition value is not beyond the number of memory area lines in the comparator 36, the number of lines corresponding to the addition value is selected in the selector 35. Thus, a final address is calculated in such a manner as vertical address x memory area width+horizontal address.

On the other hand, when the number of lines corresponding to the addition value is beyond the number of memory area lines in the comparator 36, a value in which the number of memory area lines is subtracted from the number of lines corresponding to the addition value is selected in the selector 35. Thus, an extra portion is again read from the initial address of the expanded image buffer 22.

As described above, according to the second embodiment, since it is not necessary to store the expanded image data for one frame in the SDRAM during the image reproduction, a circuit configuration with less memory can be provided.

Furthermore, the circular addressing is used in the memory area, so that the circuit configuration with less memory can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image processing apparatus which subjects, to image processing for reproduction, at least one of input compressed image data and compressed image data read from a recording medium, the apparatus comprising:
   an expansion processing unit which subjects the compressed image data to expansion processing to obtain expanded image data;
   a storage unit which stores the expanded image data;
   a resize unit which reads every block the expanded image data stored in the storage unit and then subjects the expanded image data to resize processing to obtain image data for display; and
   a control unit which controls execution of the resize processing by the resize unit in accordance with the number of expanded image data stored in the storage unit.

2. The image processing apparatus according to claim 1, wherein the control unit includes:
   a count section which counts the number of expanded image data stored in the storage unit; and
   a comparison section which compares, with a predetermined value, the number of expanded image data counted by the count section,
   the control unit controlling the execution of the resize processing on the basis of a comparison result in the comparison section.

3. The image processing apparatus according to claim 2, wherein the control unit outputs, to the resize unit, a wait signal to suspend the resize processing when the comparison result in the comparison section is that the number of expanded image data is below the predetermined value, and the control unit stops the output of the wait signal to the resize unit when the comparison result in the comparison section is that the number of expanded image data is above the predetermined value, thereby controlling the execution of the resize processing.

4. The image processing apparatus according to claim 2, wherein the predetermined value is a value preset in a register.

5. The image processing apparatus according to claim 3, wherein the predetermined value is a value preset in a register.

6. The image processing apparatus according to claim 2, wherein the expansion processing unit outputs a first transfer completion signal to the count section when the first predetermined number of expanded image data is obtained;
   the resize unit outputs a second transfer completion signal to the count section when the second predetermined number of expanded image data is subjected to the resize processing; and
   the count section increments a count value by the first predetermined number of data when the first transfer completion signal is input, and the count section decrements the count value by the second predetermined number of data when the second transfer completion signal is input, thereby counting the number of expanded image data.

7. The image processing apparatus according to claim 6, wherein the first predetermined number of data and the second predetermined number of data are values preset in the register.

8. The image processing apparatus according to claim 1, wherein the expansion processing in the expansion processing unit and the resize processing in the resize processing unit are started substantially at the same time.

9. An image processing apparatus which subjects, to image processing for reproduction, at least one of input compressed image data and compressed image data read from a recording medium, the apparatus comprising:
   an expansion processing unit which subjects the compressed image data to expansion processing to obtain expanded image data;
   a storage unit having a buffer with the predetermined number of memory area lines to write the expanded image data;
   a resize processing unit which reads, block by block, the expanded image data written in the storage unit and then subjects the expanded image data to resize processing to obtain image data for display; and a control unit which controls writing of the expanded image data from the expansion processing unit to the storage unit on the basis of a buffer free space in the buffer, and also controls reading of the expanded image data from the storage unit to the resize processing unit on the basis of a valid data amount in the expanded image data stored in the buffer.

10. The image processing apparatus according to claim 9, wherein the control unit controls to stop the writing of the expanded image data from the expansion processing unit to the storage unit when the buffer free space is less than a first predetermined data amount, and the control unit controls to stop the reading of the expanded image data from the storage unit to the resize processing unit when the valid data amount is less than a second predetermined data amount.

11. The image processing apparatus according to claim 10, wherein the control unit reduces the buffer free space and increases the valid data amount when the first predetermined amount of expanded image data is output from the expansion processing unit, and the control unit increases the buffer free space and reduces the valid data amount when the second predetermined amount of expanded image data is input from the storage unit to the resize processing unit, thereby determining the buffer free space and the valid data amount.

12. The image processing apparatus according to claim 10, wherein the first predetermined data amount is an amount of expanded image data written from the expansion processing unit to the storage unit at a time; and the second predetermined data amount is an amount of expanded image data necessary for the resize processing in the resize processing unit.

13. The image processing apparatus according to claim 11, wherein the first predetermined data amount is an amount of expanded image data written from the expansion processing unit to the storage unit at a time; and the second predetermined data amount is an amount of expanded image data necessary for the resize processing in the resize processing unit.

14. The image processing apparatus according to claim 9, wherein circular addressing is performed when the expanded image data is written into the buffer and when the expanded image data is read from the buffer.

15. The image processing apparatus according to claim 10, wherein circular addressing is performed when the expanded image data is written into the buffer and when the expanded image data is read from the buffer.

16. The image processing apparatus according to claim 11, wherein circular addressing is performed when the expanded image data is written into the buffer and when the expanded image data is read from the buffer.

17. The image processing apparatus according to claim 14, wherein the expansion processing unit and the resize processing unit include address generation sections to perform the addressing; and the address generation sections perform the addressing on the basis of the number of memory area lines of the buffer, the first predetermined data amount or the second predetermined data amount, the predetermined number of memory area lines, and the number of lines with which writing or reading is started in the buffer.

18. The image processing apparatus according to claim 15, wherein the expansion processing unit and the resize processing unit include address generation sections to perform the addressing; and the address generation sections perform the addressing on the basis of the number of memory area lines of the buffer, the first predetermined data amount or the second predetermined data amount, the predetermined number of memory area lines, and the number of lines with which writing or reading is started in the buffer.

19. The image processing apparatus according to claim 16, wherein the expansion processing unit and the resize processing unit include address generation sections to perform the addressing; and the address generation sections perform the addressing on the basis of the number of memory area lines of the buffer, the first predetermined data amount or the second predetermined data amount, the predetermined number of memory area lines, and the number of lines with which writing or reading is started in the buffer.

20. The image processing apparatus according to claim 10, wherein at least the first predetermined data amount, the second predetermined data amount and the predetermined number of memory area lines are values preset in a register.

* * * * *